United States Patent
Lee et al.

(10) Patent No.: US 10,554,158 B2
(45) Date of Patent: Feb. 4, 2020

(54) MOTOR CONTROL METHOD

(71) Applicants: Hyundai Motor Company, Seoul (KR); Kia Motors Corporation, Seoul (KR)

(72) Inventors: Dong Hun Lee, Gyeonggi-do (KR); Sung Do Kim, Seoul (KR); Chang Seok You, Gyeonggi-do (KR); Min Su Kang, Gyeonggi-do (KR); Joon Yong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/034,993

(22) Filed: Jul. 13, 2018

(65) Prior Publication Data
US 2019/0181780 A1    Jun. 13, 2019

(30) Foreign Application Priority Data
Dec. 7, 2017    (KR) .......................... 10-2017-0167426

(51) Int. Cl.
*H02P 6/16*    (2016.01)
*H02P 6/17*    (2016.01)
*H02P 6/28*    (2016.01)

(52) U.S. Cl.
CPC .............. *H02P 6/17* (2016.02); *H02P 6/16* (2013.01); *H02P 6/28* (2016.02)

(58) Field of Classification Search
CPC ................ H02P 6/15; H02P 6/16; H02P 6/17
See application file for complete search history.

(56) References Cited

U.S. PATENT DOCUMENTS

| | | | | |
|---|---|---|---|---|
| 5,362,222 A * | 11/1994 | Faig | ..................... | B29C 45/7666 264/40.3 |
| 7,002,318 B1 * | 2/2006 | Schulz | ................... | B60L 3/0038 318/437 |
| 7,607,437 B2 * | 10/2009 | Boyle | ............... | A61M 16/0057 128/204.18 |
| 8,278,853 B2 * | 10/2012 | Kitagawa | ................... | H02P 6/15 318/400.13 |
| 8,677,995 B2 * | 3/2014 | Boyle | ....................... | H02P 6/17 128/200.24 |
| 2007/0126384 A1 * | 6/2007 | Takata | ..................... | H02P 27/08 318/432 |

FOREIGN PATENT DOCUMENTS

| | | |
|---|---|---|
| JP | 2017135950 A | 8/2017 |
| KR | 20080097732 A | 11/2008 |
| KR | 101508815 B1 | 4/2015 |
| KR | 20160036210 A | 4/2016 |
| KR | 101749522 B1 | 6/2017 |

\* cited by examiner

*Primary Examiner* — Rina I Duda
(74) *Attorney, Agent, or Firm* — Mintz Levin Cohn Ferris Glovsky and Popeo, P.C.; Peter F. Corless

(57) ABSTRACT

A motor control method that includes: calculating an ideal position of a motor rotor based on a Hall sensor signal; calculating a current position of the motor rotor based on a rotation speed of the motor rotor; and calculating a Hall sensor offset angle as the difference between the ideal position of the motor rotor and the current position of the motor rotor.

13 Claims, 5 Drawing Sheets before applying Hall sensor offset compensation control after applying Hall sensor offset compensation control

MOTOR CONTROL METHOD

CROSS REFERENCE TO RELATED APPLICATION

The present application claims under 35 U.S.C. § 119(a) the benefit of Korean Patent Application No. 10-2017-0167426, filed Dec. 7, 2017, the entire contents of which are incorporated by reference herein.

BACKGROUND

(a) Technical Field

The present disclosure relates to a motor control method, more particularly, to a method of accurately controlling the position and speed of a rotor of a motor by compensating for the offset angle of a Hall sensor provided in the motor.

(b) Description of the Related Art

Generally, controlling a 3-phase brushless motor of a motor-operated power steering unit requires accurately calculating the position of the motor's rotor.

A stator of a motor uses a magnet formed by applying a current through a 3-phase coil, while the rotor uses a permanent magnet in which N-poles and S-poles are arranged alternatingly. In order for the motor to rotate continuously, a continuously rotating magnetic field for the motor is needed, and in order to form a continuously rotating magnetic field, the current flowing through the coil of each phase in the armature has to be rectified at the appropriate points of time. This rectification requires accurate recognition of the rotor's position. The term "rectification" refers to altering the direction of the current in the coils of the motor's stator to allow the rotor to rotate.

For smooth operation of such a motor, the position of the rotor and the point of time at which the phase current is altered have to be coordinated in a precise manner, and this requires a device for detecting the position of the rotor. Generally, a Hall sensor is used, in which the potential difference is varied according to the magnetic flux, or a CT (current transformer) is installed on each phase of the stator, in order to detect the position of the rotor.

In particular, a blower used in the air supply system of a fuel cell uses a permanent-magnet motor, in which the rotor includes a permanent magnet, and the control of such a type of permanent-magnet motor requires sensing the current position of the rotor. In consideration of packaging and costs, a Hall sensor, which is comparatively small in size and inexpensive, is used in sensing the current position of the rotor. The Hall sensor determines the position of the rotor by way of position sensors attached to the rotor and stator. However, due to manufacturing tolerances in the attaching of the position sensors, there exists an offset angle when sensing the position of the rotor with a Hall sensor.

Also, depending on how long the motor has been used, there may arise the problem of the Hall sensor deviating from the intended position. As this creates errors in the sensing of the rotor position, it decreases the precision of the current control in the inverter and lowers the inverter efficiency. Therefore, there is a need to measure and compensate for the offset angle in the Hall sensor before the current control.

The foregoing is intended merely to aid in the understanding of the background of the present disclosure and is not intended to mean that the present disclosure falls within the purview of the related art that is already known to those skilled in the art.

SUMMARY

Accordingly, the present disclosure provides a motor control method that calculates and compensates for a total of six offset angles at the rising and falling edges of the phases (U phase, V phase, and W phase) of a Hall sensor.

In order to achieve the objective above, according to one aspect of the present disclosure, there is provided a motor control method that includes: calculating, by a controller, an ideal position of a motor rotor based on a Hall sensor signal; calculating, by the controller, a current position of the motor rotor based on a rotation speed of the motor rotor; and calculating, by the controller, a Hall sensor offset angle as the difference between the ideal position of the motor rotor and the current position of the motor rotor.

A step of calculating the rotation speed of the motor may further be included, before the step of calculating the ideal position of the motor rotor.

The step of calculating the rotation speed of the motor may include calculating the electrical rotation speed of the motor by using the equations shown below:

$$\omega_r = \frac{1}{T_{Hall\_update}}, T_{Hall\_update} = T_{Hall} - T_{Hall\_old},$$

where $\omega_r$ represents the electrical rotation speed [rad/s], $T_{Hall\_update}$ represents the time spent in changing a Hall sensor value, $T_{Hall}$ represents the point of time at which the Hall sensor value changes, and $T_{Hall\_old}$ represents the point of time at which the Hall sensor value changed previously.

A step of determining whether or not the amount of change in the motor rotation speed is smaller than a preset reference change amount may further be included, after the step of calculating the rotation speed of the motor, wherein the ideal position of the motor rotor and the current position of the motor rotor may be calculated when the amount of change in the motor rotation speed is smaller than the preset reference change amount.

The step of calculating the ideal position of the motor rotor may include calculating the ideal position of the motor rotor with reference to a point of time at which the signal of the Hall sensor changes.

The step of calculating the ideal position of the motor rotor may include calculating the ideal position of the motor rotor by using the equation shown below:

$$\theta_{Hall} = \theta_{Edge} + \frac{180}{\pi}\omega_r \Delta T$$

where $\theta_{Hall}$ represents the current position angle of the Hall sensor [deg], $\theta_{Edge}$ represents the ideal position angle at the point of time at which the signal of the Hall sensor is changed, $\omega_r$ represents the electrical rotation speed of the motor [rad/s], and $\Delta T$ represents the time passed since the point of time at which the signal of the Hall sensor was changed.

The step of calculating the current position of the motor rotor may include calculating the angle rotated by the motor rotor from the position of the motor rotor at the previous PWM switching duty operation.

The step of calculating the current position of the motor rotor may include calculating the current position of the motor rotor by using the equation shown below:

$$\theta_{Spd} = \theta_{Old} + \frac{180}{\pi}\omega_r T_{PWM},$$

where $\theta_{Spd}$ represents the position angle of the motor rotor at the current PWM switching duty operation [deg], $\theta_{Old}$ represents the position angle of the motor rotor at the preceding PWM switching duty operation [deg], $\omega_r$ represents the electrical rotation speed of the motor [rad/s], and $T_{PWM}$ represents the PWM switching duty operation cycle.

A step of determining whether or not the rotation speed of the motor is greater than or equal to a preset reference rotation speed may further be included, after the step of calculating the rotation speed of the motor, wherein the ideal position of the motor rotor and the current position of the motor rotor may be calculated when the rotation speed of the motor is greater than or equal to the preset reference rotation speed.

The steps of calculating the ideal position of the motor rotor and the current position of the motor rotor may include calculating the ideal position of the motor rotor and the current position of the motor rotor at a reference point of time, which may be any one point of time selected from the points of time at which a signal change occurs in the U phase, the W phase, or the V phase of the Hall sensor.

The steps of calculating the ideal position of the motor rotor and the current position of the motor rotor may include synchronizing the ideal position of the motor rotor and the current position of the motor rotor with respect to the ideal position of the motor rotor at the point of time of signal change of the Hall sensor selected as the reference point of time whenever the point of time of signal change of the Hall sensor selected as the reference point of time is repeated.

The step of calculating the Hall sensor offset angle may include calculating the Hall sensor offset angle at the points of time of signal change of the Hall sensor other than the point of time of signal change of the Hall sensor selected as the reference point of time.

A step of calculating the Hall sensor offset angle at the point of time of signal change of the Hall sensor selected as the reference point of time may further be included, before the step of calculating the Hall sensor offset angle, wherein the step of calculating the Hall sensor offset angle at the point of time of signal change of the Hall sensor selected as the reference point of time may include: applying inertia braking by controlling the electric current flowed to the motor as zero, i.e., 0 [A], and calculating based on the d-axis voltage and the q-axis voltage of a synchronous coordinate system during the inertia braking.

A step of controlling the motor based on the actual position of the motor rotor may be further included, after the calculating of the Hall sensor offset angle, wherein the actual position may be calculated by compensating for the calculated Hall sensor offset angle.

A non-transitory computer readable medium containing program instructions executed by a processor can include: program instructions that calculate an ideal position of a motor rotor based on a Hall sensor signal; program instructions that calculate a current position of the motor rotor based on a rotation speed of the motor rotor; and program instructions that calculate a Hall sensor offset angle as a difference between the ideal position of the motor rotor and the current position of the motor rotor.

The motor control method according to an embodiment of the present disclosure makes it possible to accurately calculate the position of a motor's rotor by calculating the Hall sensor offset angle.

According to the present disclosure, there is also the effect of ensuring precision in the motor control using the relatively inexpensive Hall sensor.

According to the present disclosure, there is also the effect of increased inverting efficiency, as the inverter, which supplies driving power to the motor, can be controlled with greater precision.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
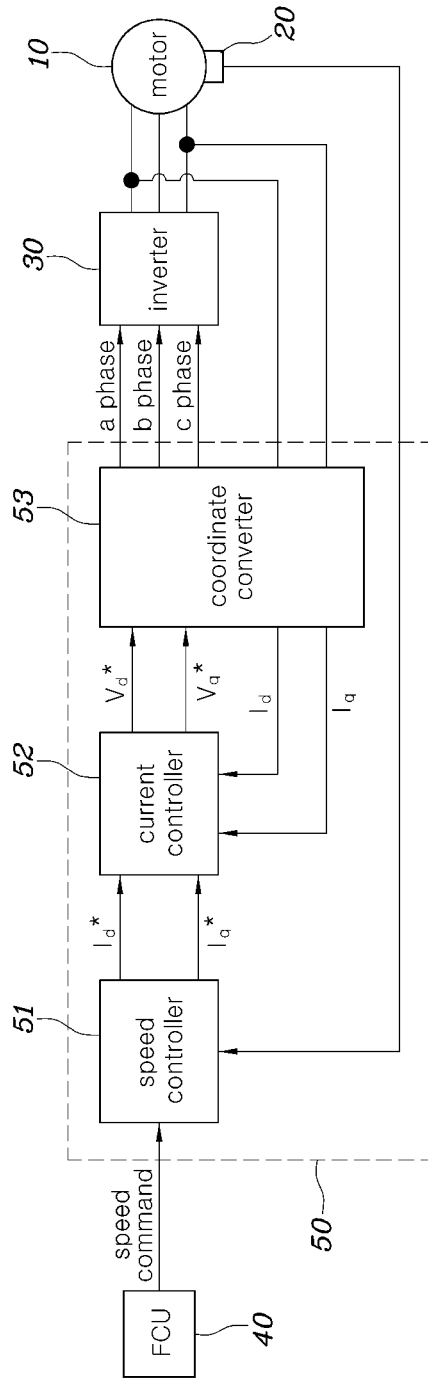
FIG. 1 is a schematic view of a motor control system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

Hereinbelow, exemplary embodiments of the present disclosure will be described in detail with reference to the accompanying drawings. Throughout the drawings, the same reference numerals will refer to the same or like parts.

A motor associated with an embodiment of the disclosure is a motor having a permanent magnet, and the speed, torque, etc. of the motor may be controlled by an inverter. In particular, the motor associated with an embodiment of the disclosure may be a motor used in an air blower that supplies air to the fuel cell system.

A permanent-magnet motor may include a Hall sensor to measure the position and speed of a rotor, which rotates with a permanent magnet mounted within the motor. While a drivetrain motor may use a resolver sensor, which provides superior precision but is typically expensive, a motor used in a common pump, compressor, or blower may be mounted with the Hall sensor, which is typically more economical.

The points of time at which a change occurs in a Hall sensor signal may include a rising edge, where the signal changes from 0 to 1, and a falling edge, where the signal changes from 1 to 0. A digital signal receiver part configured to receive such Hall sensor signals may generate an interrupt at the points of time of Hall sensor signal changes to accurately inform the CPU of these points of time. The CPU receives absolute time information (operation time) via a clock.

In certain high-performance microcontroller units (MCU), the signal processing unit and CPU for performing various logic operations, as well as the clock, etc. may be implemented as a single physically integrated unit.

Although the signals of a Hall sensor are generally provided for a U phase, a V phase, and a W phase mounted with 120-degree electrical intervals in a typical motor, various other configurations are also possible, such as a single-phase, 2-phase, 4-phase, etc. implementations.

FIG. 1 is a schematic view of a motor control system according to an embodiment of the present disclosure.

Referring to FIG. 1, a motor control system according to an embodiment of the present disclosure has the motor 10 controlled by an inverter 30 and the inverter 30 controlled by an inverter controller 50. The inverter controller 50 receives a speed command from a higher-level controller, i.e. the fuel cell controller (FCU) 40, and issues a command of a 3-phase current to the inverter 30, and the inverter 30 provides a 3-phase current to the motor 10 according to the 3-phase current command.

The motor 10 is mounted with a Hall sensor 20, and the Hall sensor 20 measures the position, speed, etc. of the motor rotor. The measured Hall sensor 20 signal may be used for feedback control at a speed controller 51 within the inverter controller 50.

In particular, a current controller 52 inside the inverter controller 50 receives input of target current values (Id*, Ice) of a synchronous coordinate system from the speed controller 51 and transfers target voltage values (Vd*, Vq*) to the coordinate converter 53, and the coordinate converter 53 may convert the target voltage values of the synchronous coordinate system into 3-phase target voltage values (a phase, b phase, c phase) and provide these to the inverter 30. Based on the 3-phase target voltage values thus provided, the inverter 30 may provide a 3-phase current to the motor 10 by way of the PWM output duty of the 3-phase switching circuit.

In the case of a surface-attached permanent-magnet synchronous motor, the driving current provided from the inverter 30 to the motor 10 is a 3-phase current, and this may be proportional to the synchronous coordinate system q-axis current (Iq). Here, the synchronous coordinate system d-axis current (Id) may be zero, i.e., 0 [A].

The current controller 52 may provide a control value to the inverter 30 such that the measured value of the driving current supplied to the motor 10 by the inverter 30 follows a target value. Between the inverter 30 and the motor 10, a current sensor (not shown) may be provided which measures the driving current supplied to the motor 10 from the inverter 30. The sensor (not shown) may measure two currents from among the 3-phase driving current and may provide them as feedback to the current controller 52 via the coordinate converter 53. The current controller 52 may provide feedback control such that the measured values (Id, Iq) of the measured driving current follow the target current values (Id*, Iq*) received as input from the speed controller 51.

While the current sensor (not shown) for sensing the 3-phase current provided to the motor 10 generally senses the currents of two phases from among the 3-phase current, in some cases a current sensor (not shown) may be mounted for just one phase or for each of all three phases.

Figure 2:
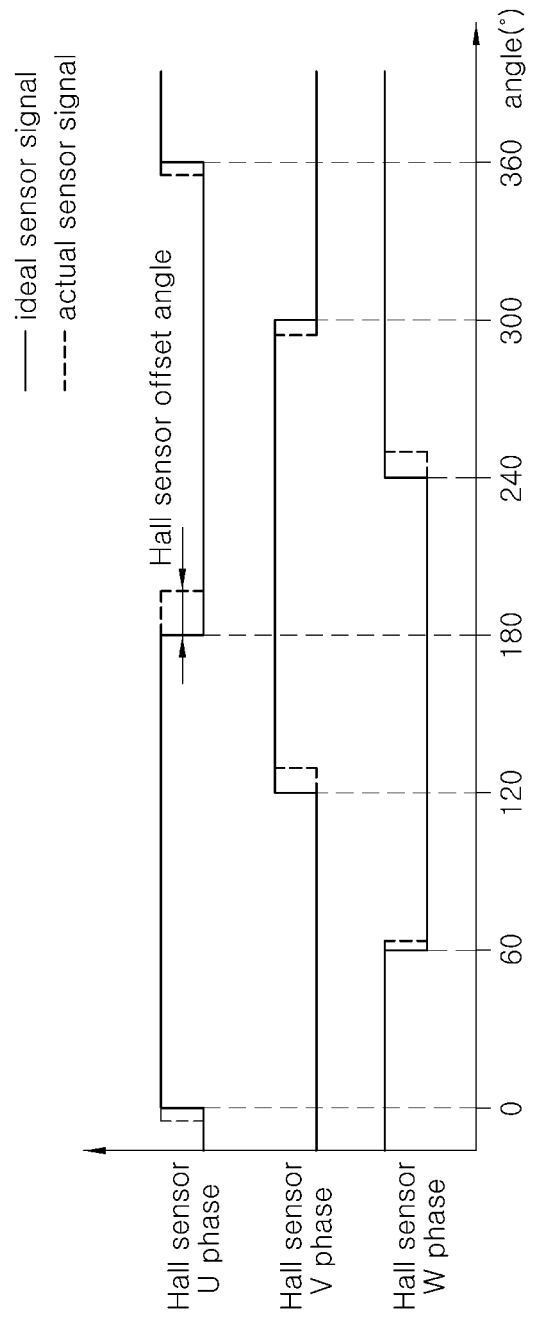
FIG. 2 illustrates the occurrence of offset angles in the Hall sensor of a motor.

FIG. 2 illustrates the occurrence of offset angles in the Hall sensor of a motor.

Referring to FIG. 2, a 3-phase Hall sensor may be mounted on a permanent-magnet motor, and in cases where the permanent-magnet motor, Hall sensor, and mounting position, etc. of the Hall sensor are ideally and accurately implemented, the Hall sensor signals of the three phases (U phase, V phase, and W phase) may change in intervals of 120°, with the interval between a rising edge, at which the signal changes from 0 to 1, and a falling edge, at which the signal changes from 1 to 0, being 180° for each Hall sensor signal.

However, in an actual manufactured permanent-magnet motor, it is difficult to have the permanent magnet itself formed in exactly 180°, and it is also difficult to have the Hall sensor assembled with the intervals between the three phases set to exactly 120°. As a result, the Hall sensor signals do not change in 180° intervals, due to manufacturing errors. Thus, as illustrated by the dotted lines in FIG. 2, there occur Hall sensor offset angles, which represent errors between ideal Hall sensor signal changes and actual Hall sensor signal changes.

To obtain each Hall sensor offset angle, one may first choose any one point of time of an ideal Hall sensor signal change as a reference point of time. Here, the rising edge of the U-phase Hall sensor signal was defined as 0° and chosen as the reference point of time. Accordingly, the W-phase rising edge 60°, V-phase rising edge 120°, U-phase falling edge 180°, W-phase falling edge 240°, and V-phase falling edge 300° can be defined as well in 60-degree intervals. A point of time at which any of the six Hall sensor signal changes occur may be selected as the reference point of time.

With the point of time of a signal change in the U phase, W phase, or V phase of the Hall sensor selected as the reference point of time, the ideal position of the motor rotor and the current position of the motor rotor may be calculated. Thus, a description is provided below of a method of calculating the remaining five Hall sensor offset angles after selecting the rising edge of the U-phase Hall sensor signal selected as the reference point of time.

Figure 3:
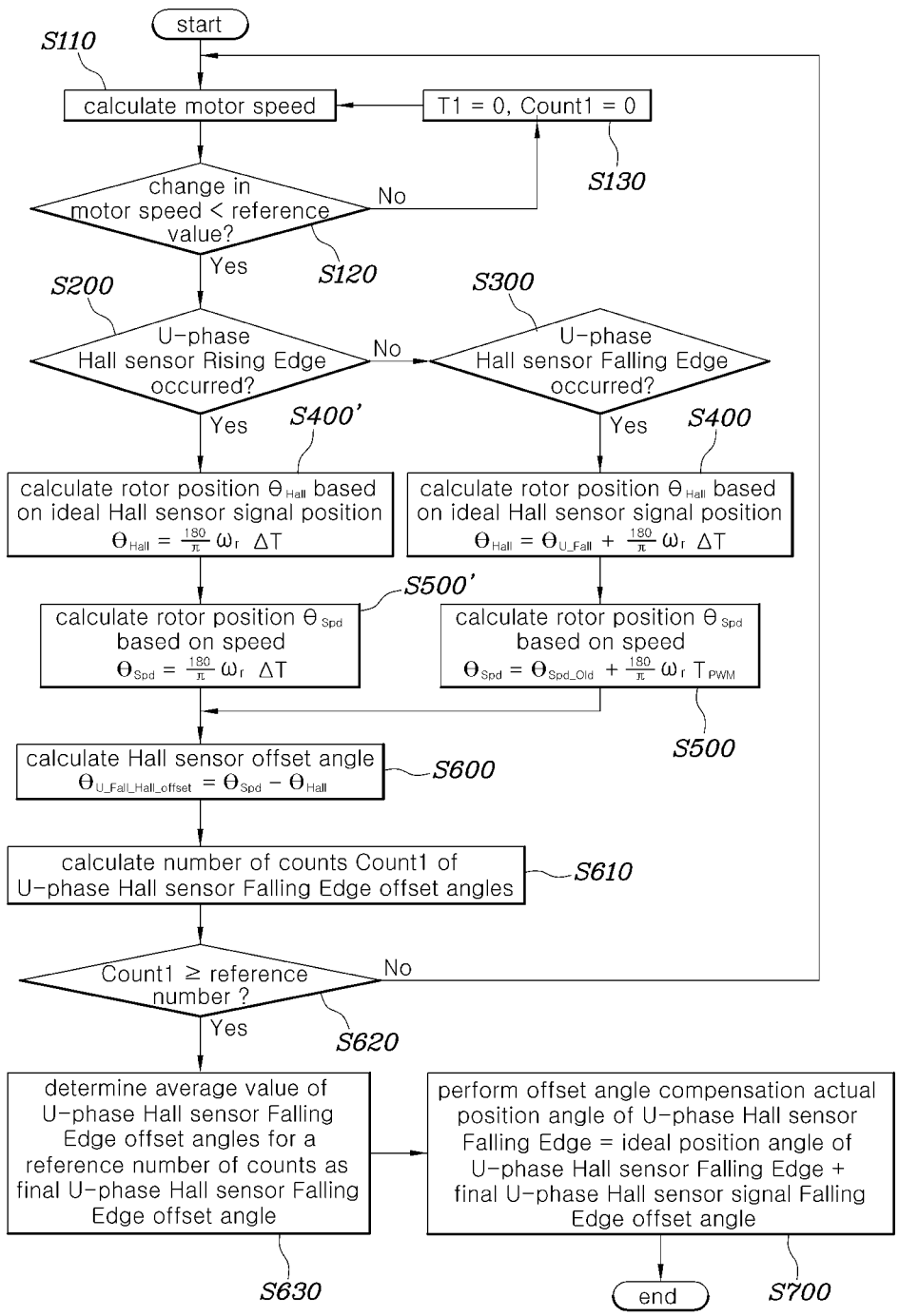
FIG. 3 is a flowchart illustrating a motor control method according to an embodiment of the present disclosure.

FIG. 3 is a flowchart illustrating a motor control method according to an embodiment of the present disclosure.

In referring to FIG. 3, a flowchart is provided only for a method of calculating the offset angle for the falling edge of the U-phase Hall sensor signal, from among the offset angles for the rising edges and falling edges of the three U phase, V phase, and W phase of the Hall sensor. The procedures for calculating the offset angles for the other Hall sensor signals are omitted, as including these in the flowchart would render the flowchart overly complicated. The other offset angles may be calculated in the same manner and may be calculated in parallel with the calculation of offset angle for the U-phase Hall sensor signal falling edge.

A motor control method according to an embodiment of the present disclosure includes: calculating the ideal position of the motor rotor based on Hall sensor signals (S400); calculating the current position of the motor rotor based on the rotation speed of the motor rotor (S500); and calculating the Hall sensor offset angle as the difference between the ideal position of the motor rotor and the current position of the motor rotor (S600).

Before the step of calculating the ideal position of the motor rotor (S400), a step of calculating the rotation speed of the motor (S110) may further be included.

The rotation speed of the motor may be calculated by using the equation below:

$$\omega_r = \frac{1}{T_{Hall\_update}}, T_{Hall\_update} = T_{Hall} - T_{Hall\_old},$$

where $\omega_r$ represents the electrical rotation speed [rad/s], $T_{Hall\_update}$ represents the time spent in changing a Hall sensor value, $T_{Hall}$ represents the point of time at which the Hall sensor value changes, and $T_{Hall\_old}$ represents the point of time at which the Hall sensor value changed previously.

The actual rotation speed of a motor may be N times the electrical rotation speed of the motor according to the number of poles of the motor.

Figure 4:
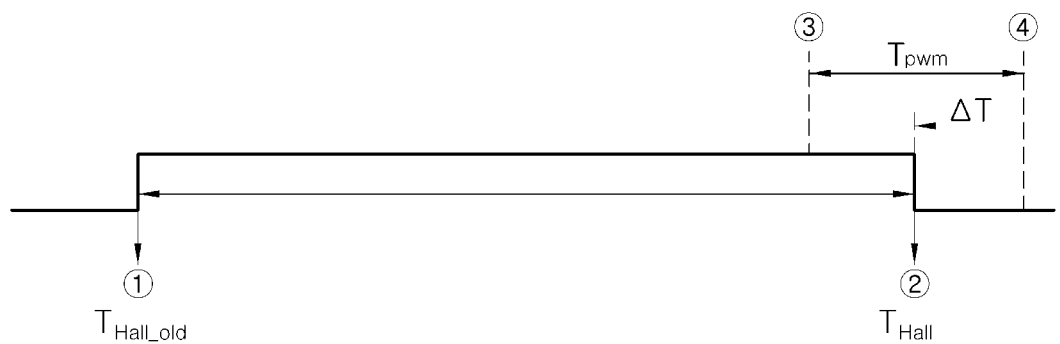
FIG. 4 illustrates a change in the signal of a Hall sensor.

FIG. 4 illustrates a change in the signal of a Hall sensor.

As illustrated in FIG. 4, $T_{Hall\_update}$ may be calculated as the time passed between the point of time at which the Hall sensor value changes and the previous point of time at which the Hall sensor value changed.

Here, while $T_{Hall\_update}$ may be applied for any of the U phase, V phase, or W phase, it may be more accurate to calculate the value for the U phase, which serves as the reference point of time. In particular, while FIG. 4 depicts the value as the time between a rising edge and a falling edge, it may be more accurate to use the time measured between a rising edge and a subsequent rising edge divided by 2, as the value thus obtained would not be affected by the Hall sensor offset angle.

Referring again to FIG. 3, the step of calculating the ideal position of the motor rotor (S400) may calculate the ideal position of the motor with reference to a point of time at which the signal of the Hall sensor changes. To be more specific, the ideal position of the motor rotor may be calculated by using the equation below:

$$\theta_{Hall} = \theta_{Edge} + \frac{180}{\pi}\omega_r \Delta T$$

where $\theta_{Hall}$ represents the current position angle of the Hall sensor [deg], $\theta_{Edge}$ represents the ideal position angle at the point of time at which the signal of the Hall sensor is changed, $\omega_r$ represents the electrical rotation speed of the motor [rad/s], and $\Delta T$ represents the time passed since the point of time at which the signal of the Hall sensor was changed.

In cases where the rising edge of the U phase is used as the reference point of time, $\theta_{Edge}$ may be the position angle at the remaining five signal change times.

Since a motor controller uses a switching frequency from several kHz to several tens of kHz, the PWM duty has to be determined by way of complex operations related to the motor control performed within a time of about 100 us, and as a result, the operating load is extremely high. Thus, due to the constraint of the operating load of the motor controller, it is impossible to shorten the cycle of checking the signals of the Hall sensor unlimitedly.

An inverter controller has a 3-phase switching circuit for controlling the 3-phase output and, by performing a PWM duty control for the six switches in the 3-phase switching circuit at a frequency of several kHz to several tens of kHz, conducts current control for controlling the motor's output. The inverter controller performs various operations needed for determining the PWM duty (such as calculating the position and speed of the motor, 3-phase current sensing, current control, determining the next 3-phase voltage output value, determining the next PWM duty, etc.) at every update cycle $T_{PWM}$ of the PWM duty determined by the switching frequency of the 3-phase switching circuit.

Here, for accurate current control of the current controller included in the inverter controller, accurate information regarding the position and speed of the motor must be known at every PWM duty cycle. Thus, the signal of Hall sensor may be measured at every PWM switching duty operation cycle ($T_{PWM}$) to calculate the position angle of the motor rotor. That is, the PWM switching duty operation cycle ($T_{PWM}$) may be the same as the cycle of measuring the position angle of the motor rotor.

The step of calculating the current position of the motor rotor (S500) may include calculating the current position of the motor rotor from the angle by which the motor rotor has rotated from the position of the motor rotor at the previous PWM switching duty operation. In particular, the current position of the motor rotor may be calculated by using the equation below:

$$\theta_{Spd} = \theta_{Old} + \frac{180}{\pi}\omega_r T_{PWM},$$

where $\theta_{Spd}$ represents the position angle of the motor rotor at the current PWM switching duty operation [deg], $\theta_{Old}$ represents the position angle of the motor rotor at the preceding PWM switching duty operation [deg], $\omega_r$ represents the electrical rotation speed of the motor [rad/s], and $T_{PWM}$ represents the PWM switching duty operation cycle.

After the step of calculating the rotation speed of the motor (S110), a step of determining whether or not the amount of change in the motor rotation speed is smaller than a preset reference change amount (S120) may further be included, and the ideal position of the motor rotor and the current position of the motor rotor may be calculated when the amount of change in the motor rotation speed is smaller than the preset reference change amount. When the amount of change in the motor rotation speed is greater than or equal to the preset reference change amount, then the measured time T1 and the Hall sensor offset angle count number COUNT1 may be reset to 0 (S130).

That is, when the amount of change of the motor rotation speed is smaller than the reference change amount, it can be supposed that the motor is being driven at constant speed. In addition, the condition that the time during which the amount of change in the motor rotation speed is smaller than the reference change amount is maintained for a particular duration or longer may also be added.

This is because the accuracy of speed-based rotor position calculation value used in calculating the Hall sensor offset angle is higher when the motor is driven at constant speed. The accuracy of the speed-based rotor position calculation value is ensured only when the calculated speed is accurate, and whereas there is a risk of lowered accuracy because of errors between the measured speed and actual speed during periods of acceleration or deceleration, the error between the measured speed and actual speed is close to 0 during a period of constant speed.

Although it is not illustrated in the drawings, a motor control method according to another embodiment of the disclosure may further include a step of determining whether or not the motor's rotation speed is greater than or equal to a preset reference rotation speed (not shown) after the step of calculating the rotation speed of the motor (S110), and the ideal position of the motor rotor and the current position of the motor rotor may be calculated when the motor rotation speed is greater than or equal to the preset reference rotation speed.

Instead of checking whether the motor is being driven at constant speed (S120), it may be checked that the rotation speed of the motor is greater than or equal to the preset reference rotation speed, before calculating the Hall sensor offset angle in the same manner as for when there is constant speed.

The reason for checking that the reference rotation speed is exceeded is because the changes in the Hall sensor signals are slow at low speeds, so that problems occur in updating the speed, resulting in increased error between the actual speed and the calculated speed. When the condition of being greater than or equal to the reference speed is met, then it is possible to calculate the Hall sensor offset angles even under variable speed conditions. When the Hall sensor offset angle is derived from an average of calculations repeated over several times, errors occurring during periods of varied speeds may be attenuated.

The steps of calculating the ideal position of the motor rotor and the current position of the motor rotor (S400, S500) may include calculating the ideal position of the motor rotor and the current position of the motor rotor at a point of time of a signal change in the U phase, W phase, or V phase of the Hall sensor as a reference point of time. That is, the reference point of time may be one of a total of six points of time, for the rising edges and falling edges of the U phase, W phase, and V phase of the Hall sensor. The descriptions herein suppose the rising edge of the U phase as the reference point of time.

The step of calculating the Hall sensor offset angle (S600) may include calculating the Hall sensor offset angles at the remaining points of time of Hall sensor signal changes other than the point of time of the Hall sensor signal change selected as the reference point of time. Here, the descriptions focus on a method of calculating the Hall sensor offset angle for the falling edge of the U phase as a representative case. The Hall sensor offset angles for the rising edges and falling edges of the V phase and W phase may be calculated in the same manner.

The steps of calculating the ideal position of the motor rotor and the current position of the motor rotor (S400, S500) may include synchronizing the ideal position of the motor rotor and the current position of the motor rotor with respect to the ideal position of the motor rotor at the point of time of signal change of the Hall sensor selected as the reference point of time whenever the point of time of signal change of the Hall sensor selected as the reference point of time is repeated (S400', S500').

In cases where the rising edge of the U phase is selected as the reference point of time, then every point of time the rising edge of the U phase is repeated, synchronization may be performed to the ideal position of the motor rotor calculated by the equation below with respect to the repeated rising edge of the U phase.

$$\theta_{Hall} = \theta_{Spd} = \frac{180}{\pi}\omega_r \Delta T,$$

where $\theta_{Hall}$ represents the current position angle of the Hall sensor [deg], $\theta_{Spd}$ represents the position angle of the motor rotor at the current PWM switching duty operation [deg], $\omega_r$ represents the electrical rotation speed of the motor [rad/s], and $\Delta T$ represents the time passed since the point of time at which the signal of the Hall sensor was changed.

Since the position angle $\theta_{Spd}$ is calculated by a speed-based calculation of the rotation angle during the operation time and applying an integral to the result, an increase in the number of operations leads to an increase in the error of the position angle caused by speed errors.

Therefore, by synchronizing the calculated values of $\theta_{Hall}$ and $\theta_{Spd}$ at every rising edge of the U-phase Hall sensor signal selected as the reference point of time (with respect to the ideal position of the motor rotor), it is possible to resolve the errors in $\theta_{Spd}$ that may otherwise arise from errors in the integrated values of the speed-based position value due to an increase in the number of revolutions. With every revolution, the initialization and the synchronization may be performed simultaneously when there is a rising edge of the U-phase Hall sensor signal, i.e. 0°.

To increase the accuracy even further, the method may include counting the number of calculations of the Hall sensor offset angles (S610), determining whether or not the counted number of calculations is greater than or equal to a reference number (S620), and calculating the final Hall sensor offset angle by averaging the multiple number of measured and calculated Hall sensor offset angles when the counted number of calculations is greater than or equal to the reference number (S630).

Before the step of calculating the Hall sensor offset angle (S600), a step of calculating the Hall sensor offset angle at the point of time of signal change of the Hall sensor selected as the reference signal (not shown) may further be included, and the step of calculating the Hall sensor offset angle at the point of time of signal change of the Hall sensor selected as the reference point of time may include applying inertia braking by controlling the electric current flowed to the motor as zero, i.e., 0[A], and calculating based on the d-axis voltage and the q-axis voltage of a synchronous coordinate system during the inertia braking.

Here, the Hall sensor offset angle of the U-phase rising edge of the Hall sensor selected as the reference point of time may be calculated. First, the motor checks whether or not there is inertia braking, and when it is determined that the motor has enteral inertia braking, then the calculation of the Hall sensor offset angle begins. In particular, the d-axis voltage and the q-axis voltage during the inertia braking may be calculated by using the equations below, to calculate the Hall sensor offset angle accordingly.

$$v_d = R_s i_d + \left(L_{ls} + \frac{3}{2}L_{ms}\right)\frac{di_d}{dt} - \omega\left(L_{ls} + \frac{3}{2}L_{ms}\right)i_q,$$

$$v_q = R_s i_q + \left(L_{ls} + \frac{3}{2}L_{ms}\right)\frac{di_q}{dt} - \omega\left(L_{ls} + \frac{3}{2}L_{ms}\right)i_d + \omega\lambda'_m.$$

The angle calculation step calculates the offset angle with the assumption that id=0, iq=0.

$$\theta = \tan^{-1}\frac{V_d}{V_q}$$

When a Hall sensor offset angle does not appear, then according to the voltage equation above, Vd becomes 0, and hence θ also becomes 0. The Hall sensor offset angle may be calculated as the value of θ obtained from the equation above.

In this way, the Hall sensor offset angle for the U-phase rising edge, selected as the reference signal change, and the Hall sensor offset angles for the remaining five signal changes may all be calculated.

After the step of calculating the Hall sensor offset angle (S600), a step of controlling the motor based on the actual position of the motor rotor calculated by compensating for the calculated Hall sensor offset angle (S700) may further be included.

By adding the Hall sensor offset angles to the position angles occurring respectively at the rising edges and falling edges of the U phase, V phase, and W phase, the actual angles at which signal changes of the Hall sensor occur may be calculated. In particular, the compensation may be as follows:

actual position angle of U-phase Hall sensor falling edge=ideal position angle of U-phase Hall sensor falling edge+Hall sensor offset angle.

Not only the U-phase falling edge but all of the points of time of signal change of the Hall sensor may be compensated for in the same manner.

By compensating for the Hall sensor offset angles at the points of time of Hall sensor signal changes, it is possible to accurately calculate the actual position angles of the motor rotor. Then, the motor may be controlled based on the actual position of the motor rotor, calculated to closely approximate the actual value.

Figure 5A:
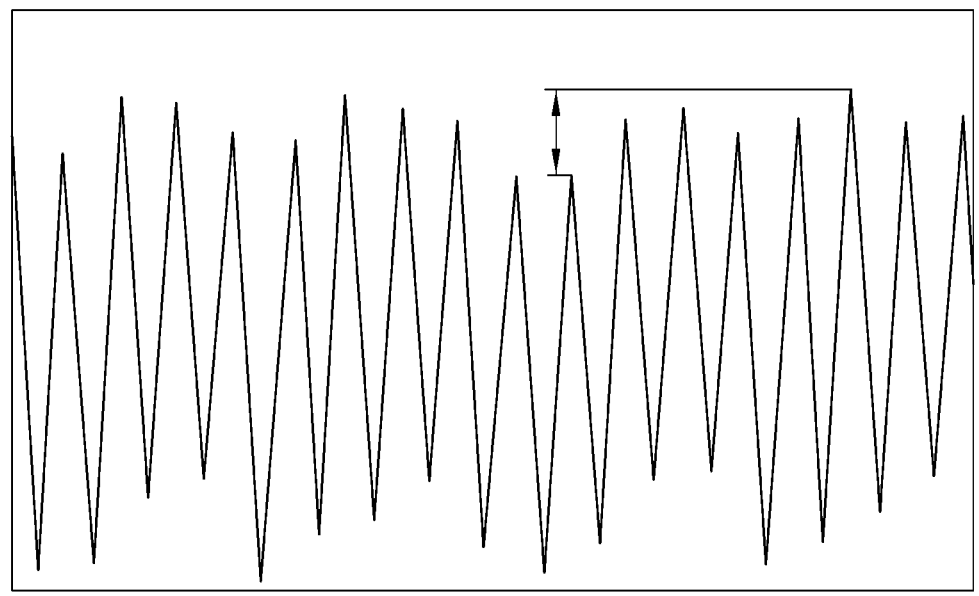
FIGS. 5A and 5B illustrate the waveforms of a 3-phase current applied to the motor before and after applying a motor control method according to an embodiment of the present disclosure.
Figure 5B:
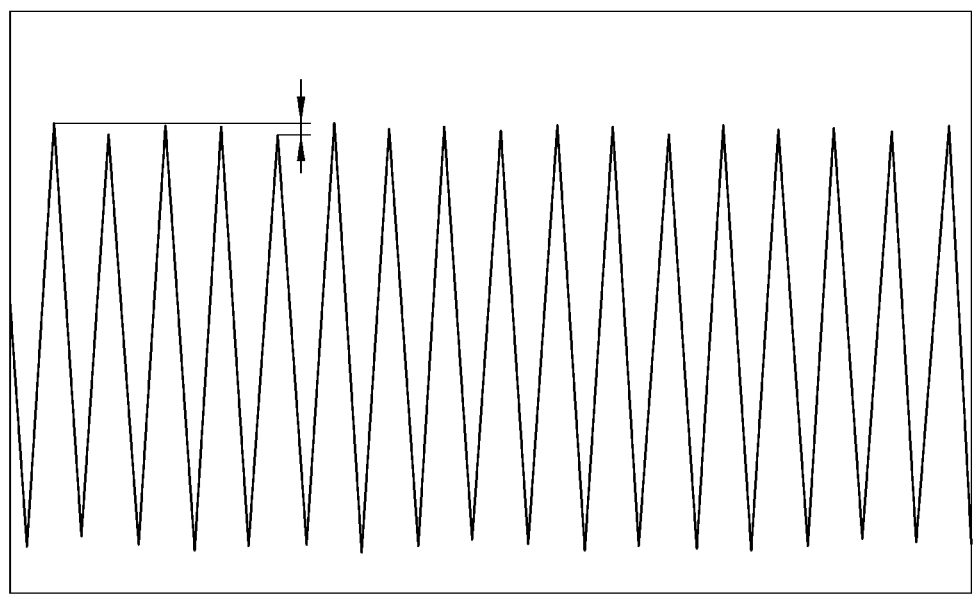

FIGS. 5A and 5B illustrate the waveforms of a 3-phase current applied to the motor before and after applying a motor control method according to an embodiment of the present disclosure.

FIGS. 5A and 5B show a 3-phase current before compensating for the Hall sensor offset angle and a 3-phase current after compensating for the Hall sensor offset angle according to an embodiment of the disclosure. As illustrated in FIGS. 5A and 5B, it can be seen that the ripple current of the 3-phase current has been greatly reduced.

That is, before compensating for the Hall sensor offset angle, the current control is shaky due to the occurrence of errors in the position angle, resulting in the problem of oscillation in the 3-phase current. In contrast, after compensating for the Hall sensor offset angle, the current control has become stabilized.

As the control of the 3-phase current is stabilized, the precision of the rotation speed of the motor and the precision of the driving torque of the motor are improved, and as oscillation is suppressed, noise and vibration are reduced, thereby providing the advantage of improved driving efficiency resulting from reduced power consumption by the motor as well as the advantage of improved durability.

In particular, in controlling the rotation speed, position, etc., of the motor or controlling the torque of the motor, the precision of position calculations of the motor rotor can achieve a level comparable to that of a resolver, so that even in a motor such as a drivetrain motor that requires precision torque control, an equivalent level of torque control precision can be achieved with the Hall sensor, which is relatively inexpensive compared to the resolver.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A motor control method, comprising:
   calculating, by a controller, an ideal position of a motor rotor based on a Hall sensor signal;
   calculating, by the controller, a current position of the motor rotor based on a rotation speed of the motor rotor; and
   calculating, by the controller, a Hall sensor offset angle as a difference between the ideal position of the motor rotor and the current position of the motor rotor,
   wherein calculating the ideal position of the motor rotor comprises calculating the ideal position of the motor rotor with reference to a point of time at which the signal of the Hall sensor changes by using an equation shown below:

$$\theta_{Hall} = \theta_{Edge} + \frac{180}{\pi}\omega_r \Delta T$$

where $\theta_{Hall}$ represents a current position angle of the Hall sensor [deg], $\theta_{Edge}$ presents an ideal position angle at the point of time at which the signal of the Hall sensor is changed, $\omega_r$ represents an electrical rotation speed of the motor [rad/s], and $\Delta T$ represents a time passed since the point of time at which the signal of the Hall sensor was changed.

2. The motor control method of claim 1, further comprising, before calculating the ideal position of the motor rotor: calculating a rotation speed of a motor having the motor rotor.

3. The motor control method of claim 2, wherein calculating the rotation speed of the motor comprises calculating an electrical rotation speed of the motor by using an equation shown below:

$$\omega_r = \frac{1}{T_{Hall\_update}}, T_{Hall\_update} = T_{Hall} - T_{Hall\_old},$$

where $\omega_r$ represents the electrical rotation speed [rad/s], $T_{Hall\_update}$ represents a time spent in changing a Hall sensor value, $T_{Hall}$ represents a point of time at which the Hall sensor value changes, and $T_{Hall\_old}$ represents a point of time at which the Hall sensor value changed previously.

4. The motor control method of claim 2, further comprising, after calculating the rotation speed of the motor, determining whether an amount of change in the motor rotation speed is smaller than a preset reference change amount,
wherein the ideal position of the motor rotor and the current position of the motor rotor are calculated when the amount of change in the motor rotation speed is smaller than the preset reference change amount.

5. The motor control method of claim 1, wherein the calculating of the current position of the motor rotor comprises calculating an angle rotated by the motor rotor from a position of the motor rotor at a previous PWM switching duty operation.

6. The motor control method of claim 5, wherein the calculating of the current position of the motor rotor comprises calculating the current position of the motor rotor by using an equation shown below:

$$\theta_{Spd} = \theta_{Old} + \frac{180}{\pi}\omega_r T_{PWM},$$

where $\theta_{Spd}$ represents a position angle of the motor rotor at a current PWM switching duty operation [deg], $\theta_{Old}$ represents a position angle of the motor rotor at a preceding PWM switching duty operation [deg], $\omega_r$ represents an electrical rotation speed of the motor [rad/s], and $T_{PWM}$ represents a PWM switching duty operation cycle.

7. The motor control method of claim 2, further comprising, after calculating the rotation speed of the motor, determining whether the rotation speed of the motor is greater than or equal to a preset reference rotation speed,
wherein the ideal position of the motor rotor and the current position of the motor rotor are calculated when the rotation speed of the motor is greater than or equal to the preset reference rotation speed.

8. The motor control method of claim 1, wherein calculating the ideal position of the motor rotor and the current position of the motor rotor comprises calculating the ideal position of the motor rotor and the current position of the motor rotor at a reference point of time, selected from points of times at which a signal change occurs in a U phase, a W phase, or a V phase of the Hall sensor.

9. The motor control method of claim 8, wherein calculating the ideal position of the motor rotor and the current position of the motor rotor comprises synchronizing the ideal position of the motor rotor and the current position of the motor rotor with respect to the ideal position of the motor rotor at the point of time of the signal change of the Hall sensor selected as the reference point of time whenever the point of time of the signal change of the Hall sensor selected as the reference point of time is repeated.

10. The motor control method of claim 8, wherein calculating the Hall sensor offset angle comprises calculating the Hall sensor offset angle at points of time of the signal change of the Hall sensor excluding the point of time of the signal change of the Hall sensor selected as the reference point of time.

11. The motor control method of claim 8, further comprising, before calculating the Hall sensor offset angle, calculating a Hall sensor offset angle at the point of time of the signal change of the Hall sensor selected as the reference point of time,
wherein calculating the Hall sensor offset angle at the point of time of the signal change of the Hall sensor selected as the reference point of time comprises: applying inertia braking by controlling an electric current flowed to the motor as zero and calculating based on a d-axis voltage and a q-axis voltage of a synchronous coordinate system during the inertia braking.

12. The motor control method of claim 1, further comprising, after calculating the Hall sensor offset angle, controlling the motor based on an actual position of the motor rotor, which is calculated by compensating for the calculated Hall sensor offset angle.

13. A non-transitory computer readable medium containing program instructions executed by a processor, the computer readable medium comprising:
program instructions that calculate an ideal position of a motor rotor based on a Hall sensor signal;
program instructions that calculate a current position of the motor rotor based on a rotation speed of the motor rotor; and
program instructions that calculate a Hall sensor offset angle as a difference between the ideal position of the motor rotor and the current position of the motor rotor,
wherein the program instructions that calculate the ideal position of the motor rotor comprises program instructions that calculate the ideal position of the motor rotor with reference to a point of time at which the signal of the Hall sensor changes by using an equation shown below:

$$\theta_{Hall} = \theta_{Edge} + \frac{180}{\pi}\omega_r \Delta T$$

where $\theta_{Hall}$ represents a current position angle of the Hall sensor $\theta_{Edge}$ represents an ideal position angle at the point of time at which the signal of the Hall sensor is changed, $\omega_r$ represents an electrical rotation speed of the motor [rad/s], and $\Delta T$ represents a time passed since the point of time at which the signal of the Hall sensor was changed.

* * * * *